Patented Aug. 4, 1931

1,817,118

UNITED STATES PATENT OFFICE

FELIX ADAMI, OF RICHMOND, ENGLAND

APPLIANCE FOR GRILLING, TOASTING, AND THE LIKE

Application filed January 26, 1929, Serial No. 335,263, and in Great Britain May 8, 1928.

This invention relates to cooking appliances applicable for grilling, toasting or the like.

According to the invention electric means are employed by which the food to be cooked is heated from two sides, that is to say, from the surface upon which the food is supported and from a position above by radiant heat.

According to the invention the appliance comprises an upper hot plate fitted with electric heating elements and adapted for the radiation of heat also in the downward direction, together with a grid or pan also provided with electric heating elements and disposed below the hot plate, the grid or pan and the hot plate being relatively adjustable in position for regulation of the distance between them.

According to the invention, moreover, the appliance may comprise a number of hot plates or grids or pans arranged in superposition and so provided that the upper of any pair of such hot plates or the like may be adapted to radiate heat downwardly towards the next lower hot plate or the like.

The appliance is further advantageously provided with switches for the separate control of the heating elements of the hot plate and the grid or pan in such manner that either or both may be put in operation.

The invention comprises the features hereinafter described.

The invention is illustrated, by way of example, in the accompanying diagrammatic drawings in which.

Figure 1:
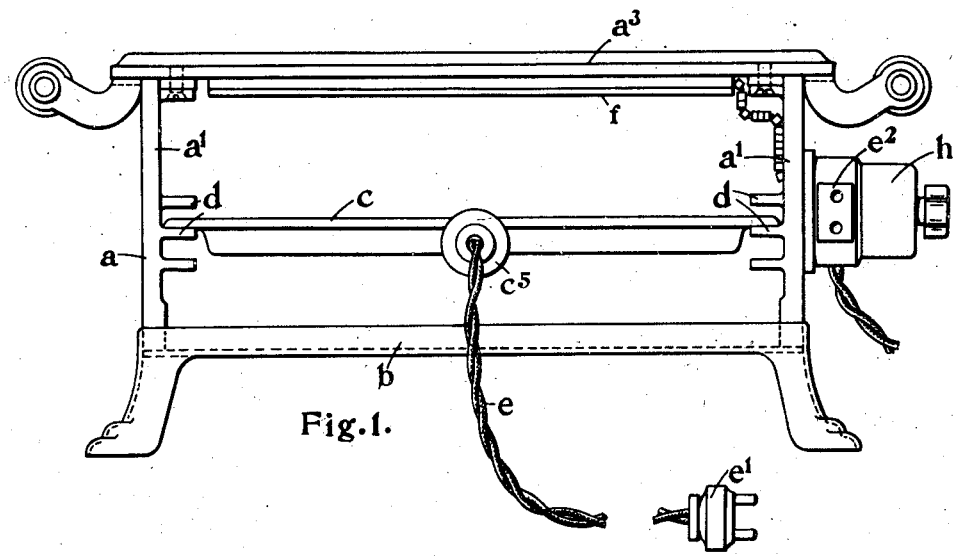
Figure 1 is a front elevation of the griller provided according to the invention.
Figure 2:
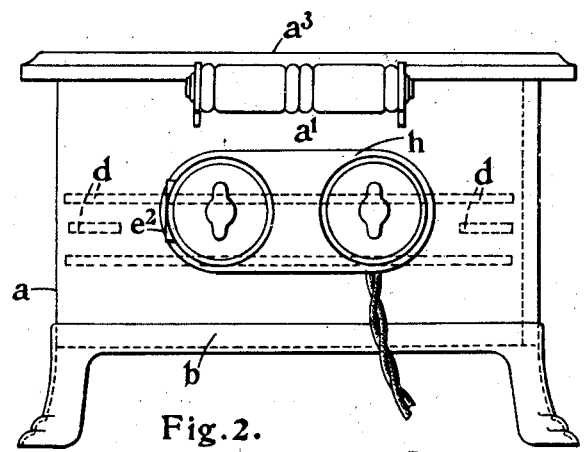
Figure 2 is a side elevation corresponding to Figure 1, with the pan or grid removed.
Figure 5:
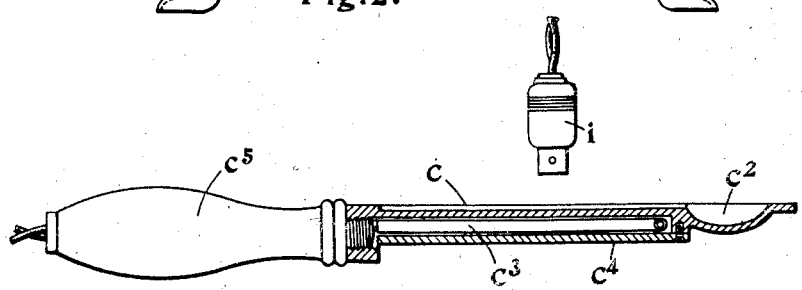
Figure 5 is an elevation partly in section of the pan or grid.
Figure 4:
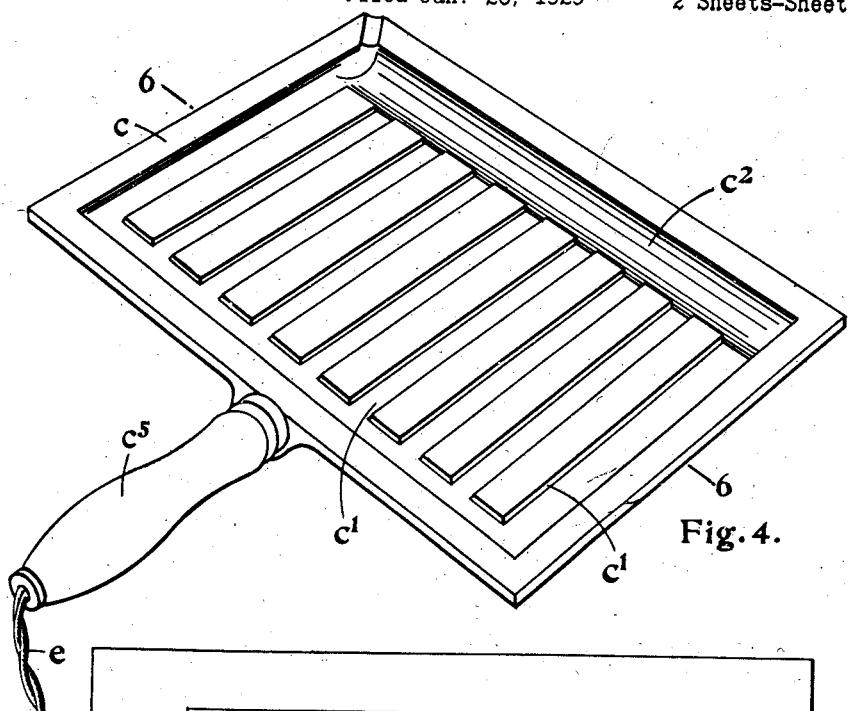
Figure 4 is a perspective view of the pan or grid provided according to the invention.
Figure 3:
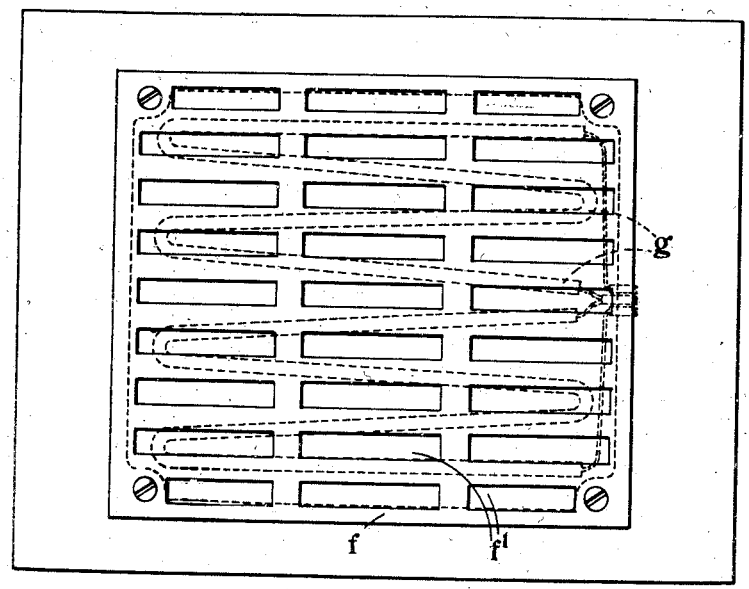
Figure 3 is an underside plan of the top plate of the griller.
Figure 6:
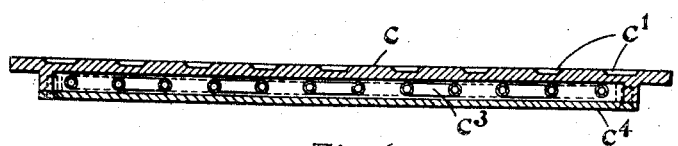
Figure 6 is a section on the line 6—6 of Figure 4.

In carrying the invention into effect according to one construction and as illustrated in the accompanying drawings, in the provision of a so-called electric griller I provide a casing $a$ of rectilinear form conveniently supported upon a base $b$. The casing $a$ may be completely enclosed except at a position in front where the pan or grid $c$ may be introduced into position within the casing $a$, prepared for its reception as, for example, by the provisions of ledges or guide-ways $d$ in oppositely disposed positions in the side walls $a^1$ of the casing $a$ at a distance a little above the bottom thereof. A series of pairs of such ledges or guide-ways $d$ may be provided so that the pan or grid may be introduced at a number of alternative positions at varying distances beneath the top of the casing $a$.

The pan or grid $c$ may be provided with a recessed surface $c^1$, the recesses being adapted for guiding liquid to flow to one end of the pan or plate where another recess or groove or grooves $c^2$ may extend adapted for the collection and retention of the liquid and from which it may be adapted to flow on the pan or grid $c$ being slightly tilted. On the underside of the pan or grid $c$ an electric resistance element $c^3$ is mounted so as to extend in zigzag or otherwise so that heat may be uniformly distributed on the underside of the pan or grid $c$, and the electric resistance element is suitably insulated and covered with a cover plate $c^4$ beneath the pan or grid so that the resistance element $c^3$ may be completely and tightly enclosed, and the leads may be passed out in a central outwardly extending position through an insulating handle $c^5$, and the flex $e$ may be provided with a plug fitting $e^1$ so that the plug may be inserted into a conveniently disposed socket $e^2$ mounted in an electric circuit from which current may be supplied.

In a position immediately beneath the top plate $a^3$ of the casing $a$ a metal plate $f$ is mounted and in position between the top and the plate an electric resistance element $g$ is mounted to extend in zig-zag or otherwise over the area of the plate $f$ in a manner similar to the pan or grid $c$. The top plate $a^3$ may be recessed on its underside so as thus to be adapted for the reception of the resistance element $g$ and plate $f$, and the leads may pass through an insulating fitting to a switch $h$ provided on the outside of the casing, and a plug fitting $i$ may be provided by which the current may be passed to the switch $h$, and through the resistance element $g$ for the purpose of heating the plate $f$. The plate $f$ may be formed as a massive plate provided with recesses $f^1$ and may serve to accumulate heat and thus to radiate heat downwardly onto the food that is supported upon the pan or grid $c$ disposed beneath it. By such means the food to be cooked is heated from beneath as well as from above.

Instead of the plate referred to being carried on the underside of the top of the casing it may be provided separately and may be adapted to be set into a number of positions at varying and determined distance above the pan or grid. It is however preferred to fixedly mount the plate in position beneath the top of the casing. Or again, the plate may be provided so as to be pivoted at the rear and so as to be adapted to have its inclination slightly varied to bring the plate towards or away from the pan or grid or the like part of the heater, and the top of the casing for this purpose may be adapted to move relatively to the lateral walls or the top plate may be provided at its sides with downward extensions adapted to serve as lateral walls; while instead of or in addition the lower part or base of the casing may be similarly provided with upward extending lateral walls closely adjacent to the lateral walls of the upper part or top plate when such are provided.

Or again, instead of providing a part of the cooking appliance as a pan or grid having a plate mounted above adapted to radiate heat on to the food that is cooked on the pan or grid the respective parts may be of substantially similar form, that is to say, two grids or other parts may be provided whereby an electric cooking appliance may be provided that is adapted for use with either grid in the uppermost position, and means may be provided by which the respective grids may be connected together at the rear or by which they may be respectively mounted in a casing, stand or support, and either or both grids may be adapted to be used at either side, that is to say, that may be either or both reversible.

Or again, the respective parts of which the heater or stove is formed may be provided or mounted in fixed relation or only one of them, while the other may be adapted to be separated from the other or from the casing or from the stand by which they are respectively supported in use. Or again, a number of such grids or the like adapted to be heated by an electric resistance wire may be mounted within the same casing, so that thus different foods or dishes may be simultaneously cooked, it being understood that the under part of one grid may serve for the radiation of heat in position beneath.

The invention does not involve any limitation to the position of the pans or grids or heat radiating plates to be used. They may for example be disposed vertically or at an inclination. Or again, they may be provided substantially horizontally and substantially vertically so that heat may be imparted from more than two sides on to the food or goods to be cooked or heated.

Again, the casings used for the reception of the pans, grids or heat radiating plates may be provided in front with a door or cover plate so as to be completely enclosed, and the cover plate or door may itself be provided with an electric resistance element, and the rear wall of the casing may be similarly provided. Thus provision may be made for the radiation of heat from any opposite sides of the casing or from all sides.

It will be understood that means may be provided by which one or more of the plates within the casing or stand may be heated and for the purpose a switch may be provided to control the heating of such parts of the stove as are immovable, while the means may be provided by which the whole current required for one heater or stove may be supplied from one set of leads.

I claim:

1. Appliances for grilling, toasting and the like operated electrically and comprising a supporting frame, an electrically heated hot plate carried by the said frame and an electrically heated grid-like pan adjustable upon the said frame relatively to the said hot plate and adapted for the direct support of food which is subjected to grilling, toasting or the like from above and below.

2. Appliances for grilling, toasting and the like operated electrically and comprising a supporting frame closed in on three sides to form an enclosure, an electrically heated hot plate forming the upper side of the said enclosure and an electrically heated grid-like pan adjustable within said enclosure relatively to the said hot plate and adapted for the direct support of the food to be grilled, toasted or the like from above and below.

3. Appliances for grilling, toasting and the like operated electrically and comprising a supporting frame covered in at the sides to form an enclosure, an electrically heated hot plate forming the upper side of the said enclosure and an electrically heated grid-like pan for the support of food adjustable upon said frame within said enclosure relatively to said hot plate, the said pan being formed with recesses leading to a collecting recess or groove whereby liquid from the food may be collected.

4. Appliances for grilling, toasting and the like, operated electrically and comprising a supporting frame forming an enclosure, an electrically heated hot plate carried by the said frame and forming the upper part of the enclosure, and a plurality of grid-like pans adjustable in position within said frame relatively to said hot plate and relatively to one another and adapted for the direct support of food to be subjected to grilling, toasting or the like from above and below.

5. Appliances for grilling, toasting and the like, operated electrically and comprising a supporting frame forming an enclosure, an electrically heated hot plate carried by said frame and forming the upper part of the enclosure, an electrically heated grid-like pan adjustable upon said frame relatively to said hot plate and adapted for the direct support of food and additional electrically heated plates movably disposed within said enclosure laterally in respect of the grid-like pan whereby the food is subjected uniformly to grilling, toasting or the like.

6. Appliances for grilling, toasting and the like, operated electrically and comprising a supporting frame forming an enclosure, an electrically heated hot plate carried by said frame and serving as the upper part of said enclosure, an electrically heated grid-like pan for the support of food adjustable upon said frame relatively to said hot plate and a door to said enclosure, said door being electrically heated.

7. Appliances for grilling, toasting and the like, operated electrically and comprising a supporting frame forming an enclosure, an electrically heated hot plate carried by the said frame and serving as the upper part of the said enclosure, the said hot plate being provided as a massive plate having recesses in the lower face thereof and an electrically heated grid-like pan for the support of food adjustable upon said frame relatively to said hot plate.

FELIX ADAMI.